Patented July 31, 1923.

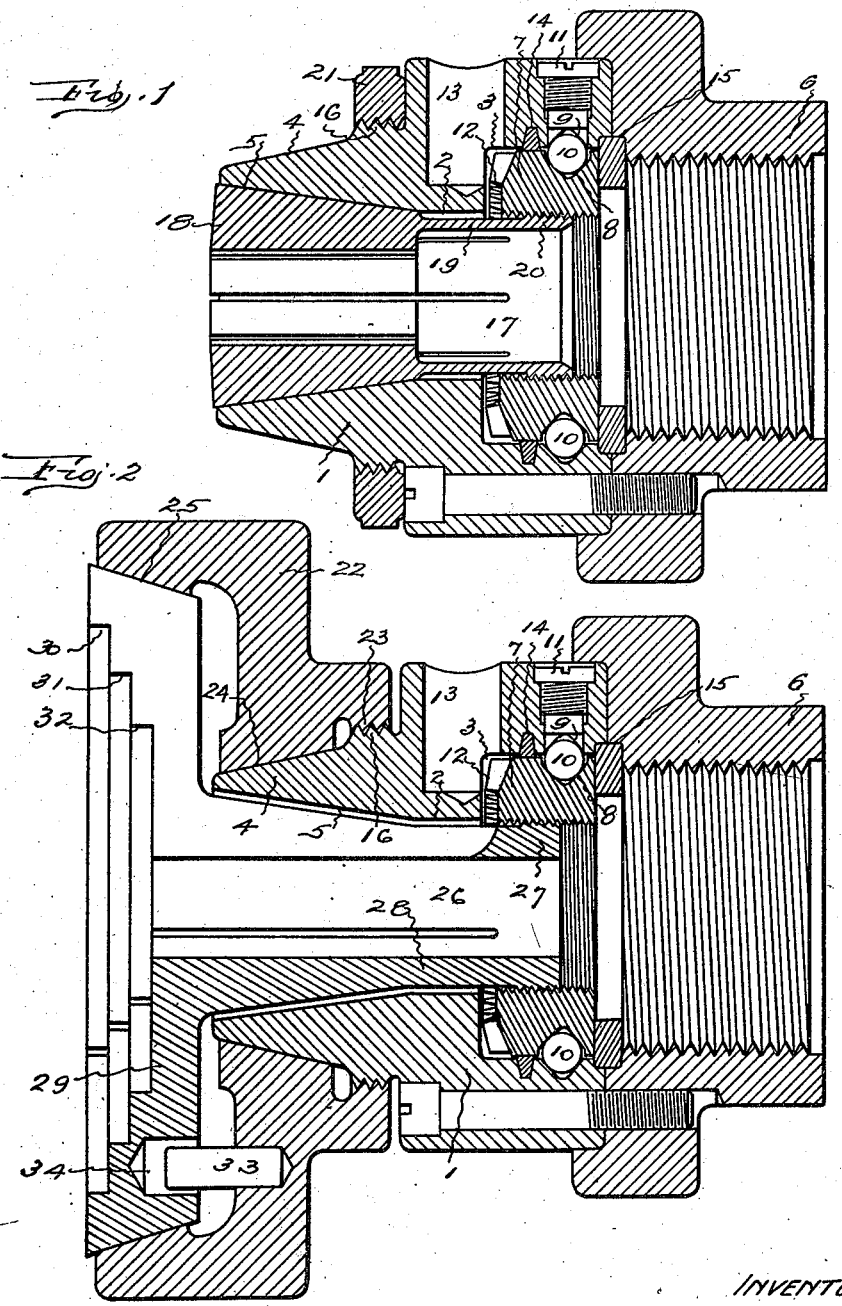

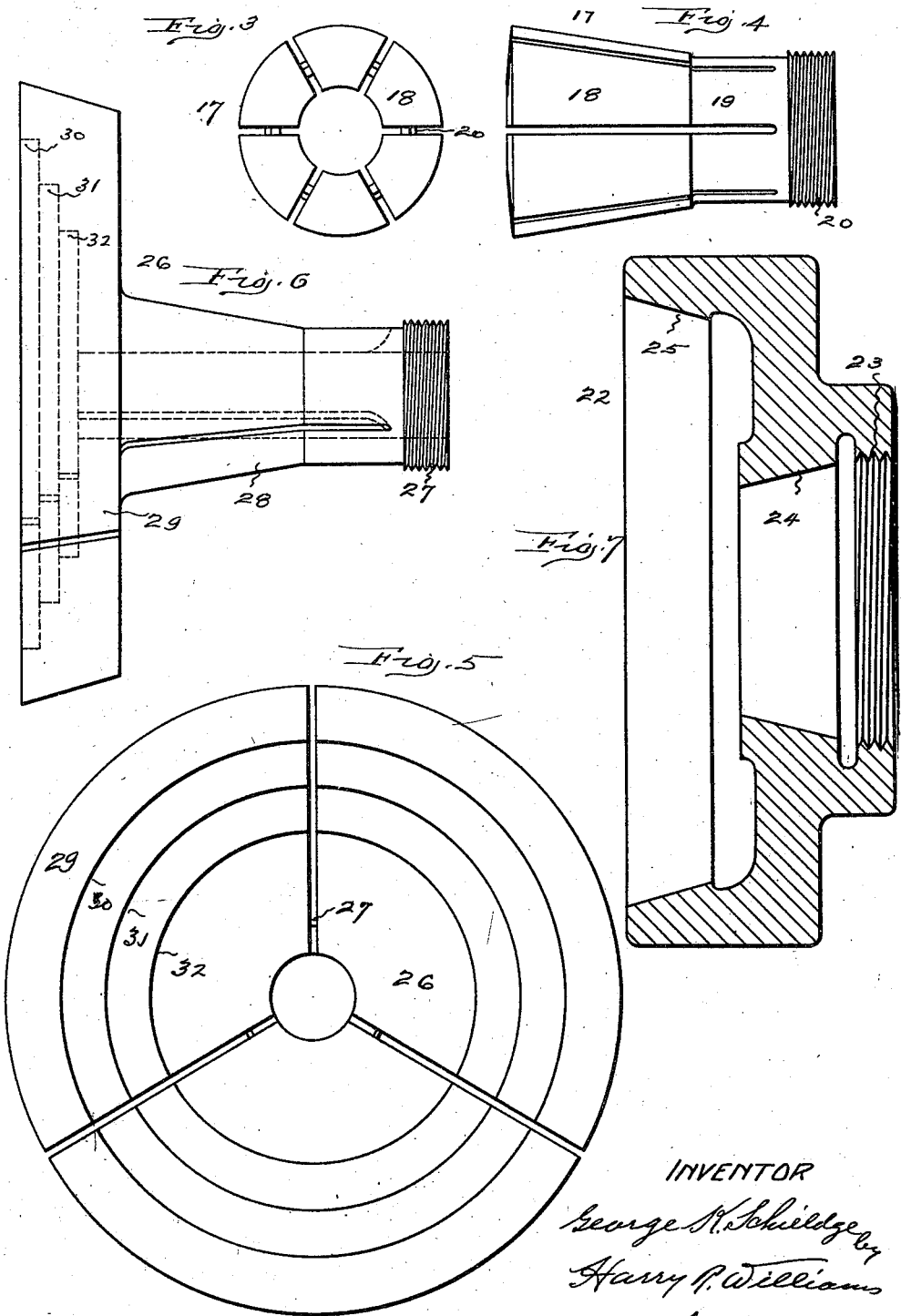

1,463,176

UNITED STATES PATENT OFFICE.

GEORGE K. SCHIELDGE, OF HARTFORD, CONNECTICUT, ASSIGNOR TO THE HARTFORD SPECIAL MACHINERY COMPANY, OF HARTFORD, CONNECTICUT, A CORPORATION OF CONNECTICUT.

CHUCK.

Application filed June 21, 1922. Serial No. 569,895.

*To all whom it may concern:*

Be it known that I, GEORGE K. SCHIELDGE, a citizen of the United States, residing at Hartford, in the county of Hartford and State of Connecticut, have invented a new and useful Improvement in Chucks, of which the following is a specification.

This invention relates to the construction of a chuck of the collet type, that is, a chuck in which the holding jaws are formed integral with or are attached to spring shanks that are connected with a sleeve which when moved in one direction in the body of the chuck causes the jaws to engage with the tapering wall of an opening and be closed thereby, and which when moved in the opposite direction carries the jaws away from the tapering wall and permits them to spring open. The constriction and expansion of collet jaws is slight consequently the common forms of this type of chuck are quite limited as to the sizes and the character of the pieces which they will hold.

The object of the present invention is to provide a chuck of this character, having means whereby it can be easily operated for tightly gripping and releasing the work, and which is so organized that it may be set up for holding a tool or small work such as wire, rods or tubes which are to be turned or drilled, or it may be set up for holding work of much greater diameter such as plates or disks the faces of which are to be operated upon.

This object is attained by so forming the body, which has readily assembled and easily operated means for advancing and retarding the collet, that it may be supplied with a small collet having gripping jaws that will extend some distance along a length of rod or tool shank, or may be supplied with a larger collet having step gripping jaws that will extend about the edges of a plate or blank, both types of collets being engaged with and advanced by the operating mechanism in the same way, whereby the capacity and usefulness of these chucks is greatly increased at a minimum expense.

Figure 1 of the accompanying drawings shows a longitudinal section of a chuck which is constructed to attain the object of the invention, provided with the small type of tool or rod holding collet. Fig. 2 shows a longitudinal section of the chuck set up and provided with the large plate-holding step collet. Fig. 3 shows an end view of the the small collet. Fig. 4 shows a side view of the small collet. Fig. 5 shows an end view of the large collet. Fig. 6 shows a side view of the large collet. Fig. 7 is a section of the removable member which is applied to the body of the chuck when a large collet is to be used.

The body 1 of the chuck has a central opening 2 with an enlarged recess 3 at the rear. At the front within the tapering nose 4 of the body the central recess is conical so as to provide the conical jaw closing wall 5. At the back the body is usually provided with a sleeve 6 by means of which the chuck may be attached to the spindle or arbor of a lathe, drill press or other machine tool with which it is to be used. In the recess 3 in the body is a nut 7. In the type of chuck illustrated the periphery of this nut is provided with a V-shaped groove 8 and the body adjacent thereto is provided with a V-shaped groove 9. Balls 10 are placed in these grooves for retaining the nut in position with a minimum amount of friction. The balls are inserted into the race-way thus provided through the opening occupied by the screw 11. On the forward face of the nut are gear teeth 12 which are adapted to be engaged by a key thrust into the socket 13 for rotating the nut. Packing washers 14 and 15 may be placed each side of the ball race for keeping lubricant therein. At the base of the tapering nose 4 of the body is an exterior screw thread 16.

The collet 17, which is termed the small collet and is more particularly designed for gripping tools, rods tubes or studs, has jaws 18 with inclined backs, which jaws are connected by spring shanks 19 with a band 20 that is exteriorly threaded to fit the threads in the interior of the nut 7. When the nut is turned in one direction the collet is drawn into the opening in the body and the engagement of the outer surfaces or backs of the collet jaws with the inclined wall 5 of the conical opening in the body causes the jaws to be contracted. When the nut is turned in the other direction the collet is carried outward and the jaws permitted to expand.

To use the chuck for holding work of greater diameter than is possible with the collet 17, the collar 21 is unscrewed from the thread at the base of the nose. This collar performs no mechanical function other than to protect the thread when the small collet is being used. After the collar has been removed the body extension member 22 is screwed upon the main body, this member having an internal thread 23 which fits the thread at the base of the nose. The body extension has a conical opening 24 shaped to fit the tapering nose 4 of the body and it has a conical opening with a tapering jaw closing wall 25 at its outer end. When this member has been screwed to position the collet 26 is inserted into the body and the exterior thread on the band 27 at its inner end is engaged with the thread in the nut 7. The band of this collet is connected by spring shanks 28 with the jaws 29 which in their faces have a number of stepped recesses, as 30, 31 and 32. With this type of collet when the nut is turned in one direction the tapering backs of the jaws engage the conical wall 25 in the opening in the body extension and the jaws are contracted. When the nut is turned in the opposite direction the collet is pushed out and the jaws permitted to expand. A pin 33 may be placed in the body extension in such manner as to project into a socket 34 in the back of one of the collet jaws so as to prevent the collet from turning when it is drawn in or pushed out.

Collets having different interior or gripping diameters, of course, are provided for these chucks. With a collet of the type shown in Fig. 1, a tool shank, or a rod, or tube or other pieces of relatively small diameters can be easily clamped by the jaws in such manner as to be tightly held, for the gripping surfaces of the jaws on the work are long and the wedging surfaces of the backs of the jaws against the conical wall in the body are extended. As stated, with collets of this type the capacity or usefulness of the chuck is limited. However the provision of the removable body extension greatly increases the capacity of the chuck, for collets of the type shown in Fig. 2 may have a number of steps in the jaws which will hold various sizes and shapes of work of very much greater diameter than can be held by the type of collet shown in Fig. 1. As a result of this invention a user need have but a single body, and if provided with the body extension he may quickly set up the chuck for holding small or large pieces of work of various character, therefore at a minimum expense to a user the capacity or range of a chuck of the collet type is largely increased.

The invention claimed is:

Chucking means comprising a body having an opening with a conical jaw closing wall, a body extension detachably mounted on the body, said extension having an opening with a conical jaw closing wall, said chucking means being adapted to receive selectively either a collet having spring jaws adapted to fit the conical jaw closing wall in the body, or a collet having spring jaws adapted to fit the conical jaw closing wall in the body extension, a nut rotatable within the body, and means for rotating the nut, said collets having threaded shanks adapted to fit the thread in said nut, whereby the chucking means may be used for holding relatively small pieces or may be used for holding relatively large pieces.

GEORGE K. SCHIELDGE.